United States Patent [19]

Suciu

[11] 3,961,705

[45] June 8, 1976

[54] CLAMPING CONVEYOR

[75] Inventor: George Suciu, Montreal, Canada

[73] Assignee: Newmapak Ltd., St-Lambert, Canada

[22] Filed: Sept. 9, 1974

[21] Appl. No.: 504,320

[52] U.S. Cl. .................................. 198/248; 198/179
[51] Int. Cl.² .......................................... B65G 47/24
[58] Field of Search ........... 198/248, 160, 179, 165, 198/31 AA

[56] References Cited
UNITED STATES PATENTS

| | | | |
|---|---|---|---|
| 1,901,042 | 3/1933 | Robbins | 198/179 |
| 3,128,881 | 4/1964 | Kuhnle | 198/179 X |
| 3,635,322 | 1/1972 | Raudat et al. | 198/179 X |
| 3,719,269 | 3/1973 | Hardwig | 198/179 |
| 3,767,028 | 10/1973 | Del Rosso | 198/165 X |

Primary Examiner—Robert J. Spar
Assistant Examiner—James M. Slattery

[57] ABSTRACT

Clamping conveyor for transporting containers of various sizes and to invert the containers during transportation. The containers are conveyed on a movable flexible endless support member to which are fixed a series of spaced clamping assemblies each of which comprises an open ended housing secured transversely to the support member, an L-shaped container gripping member having a base arm slidably extending into and being guided by the housing and having a clamping arm upstanding from the plane of the support member on one of its sides and a spring assembly which acts on the L-shaped gripping member to bias the clamping arm toward the support member. The successive clamping arms of these L-shaped members are disposed on opposite sides of the support member and interconnected by a pair of endless belts each located on one side of the support member and secured to the clamping arms. The support member is mounted on a stationary track allowing it to pivot axially by substantially 180° so that the containers being conveyed can move from upright to fully inverted position and vice versa.

11 Claims, 14 Drawing Figures

CLAMPING CONVEYOR

This invention relates generally to a multi-purpose conveyor, and more particularly to a clamping conveyor which is able to simultaneously carry containers of different sizes and to invert the containers during the transport thereof by the conveyor.

While it is known to provide a conveyor with means to apply a clamping force to a container being transported by the conveyor, such apparatus are limited in the size of the container which can be carried by the conveyor without extensive modification to the existing apparatus. In addition, such known clamping conveyors are only able to handle one size of container at a time, thereby necessitating adjustment of the machine to carry a different size of container. Further, the clamping force applied by known clamping conveyors to the containers being transported is often quite limited, and does not provide an increased clamping force with a corresponding increase in the size of the container being conveyed. As a result, a container which is larger and heavier would be subjected to the same clamping force as a smaller container. While this arrangement presents no problems so long as the bottom of the larger container is supported on a horizontal surface portion of the clamping conveyor, such a clamping conveyor would not provide sufficient force to hold the heavier container in a position in which the bottom of the container is not supported on a horizontal surface portion of the conveyor.

The subject invention overcomes these deficiencies by providing a clamping conveyor which applies a clamping force to the container being carried by the conveyor which increases in proportion to the diameter or the distance between the sidewalls of the container being conveyor. As a result, the clamping conveyor according to the subject invention is able to carry varied sizes of containers without additional support means being provided for the bottoms of the containers.

In addition, the clamping conveyor according to the subject invention is able to simultaneously convey containers of different sizes without necessitating extensive modification to the apparatus. As a result, down time for adjusting the conveyor is minimized and production efficiency is thereby improved.

More specifically, the clamping conveyor according to the invention comprises a flexible endless support member mounted to wind over driven and driving wheels so as to be brought into endless motion to convey containers placed thereon. A plurality of clamping assemblies are mounted on the support member in spaced relationship along its length, each clamping assembly comprising an open ended housing fixed transversely to the support member, an L-shaped container gripping member having a base arm slidably extending into the open ended housing to be guided therein and having a clamping arm upstanding from the plane of the support member and on one of its sides, and resilient means acting on the L-shaped gripping member to bias the clamping arm toward the support member. Successive gripping arms of the L-shaped members are disposed on opposite sides of the support member and a pair of endless flexible gripping belts, each provided on one side of the support member are fixedly secured to the clamping arms.

In accordance with a preferred embodiment of the invention, the endless support member divides up into an upper strand and a lower strand. In this embodiment, the conveyor has camming tracks on either side of the wheels along the upper strand; camming means at the free ends of the base arm of the L-shaped gripping members mounted to contact the camming tracks, the latter being disposed along the upper strand and include a central section located at a distance from the support such as to push the clamping arms of the L-shaped members away from the corresponding edges of the support member against the bias of the resilient means to widen the space between the clamping arms for the insertion and removal of the containers therebetween. Preferably, the support member is guided by support track means along the upper strand causing it to pivot axially by substantially 180° whereby as the containers are conveyed along the upper strand, they move from upright to fully inverted positions and vice versa.

In drawings which illustrate embodiments of the subject invention:

Figure 1:
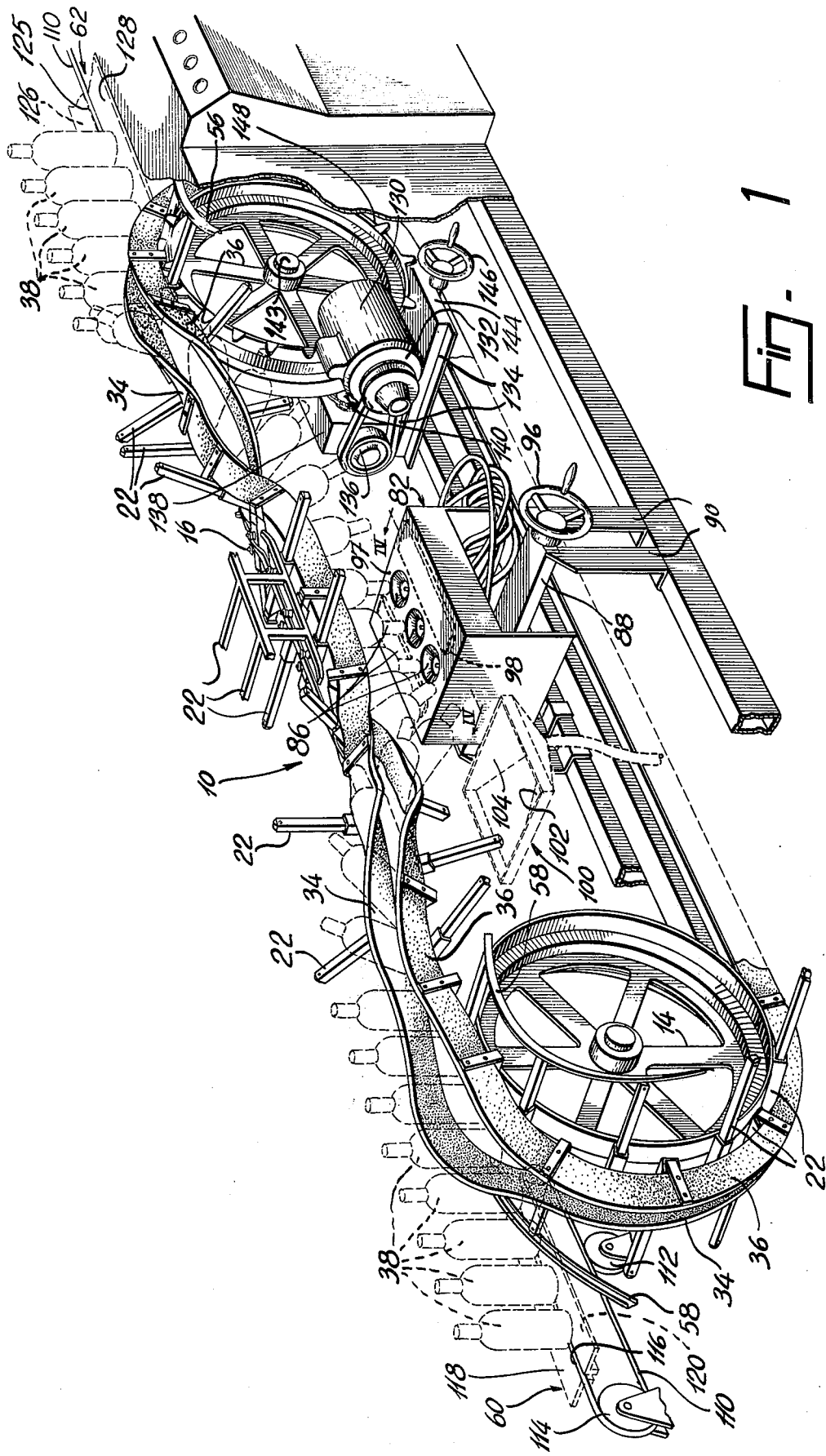
FIG. 1 is a perspective view of one embodiment according to the subject invention with the outer housing removed in order to illustrate the interior construction thereof.
Figure 2:
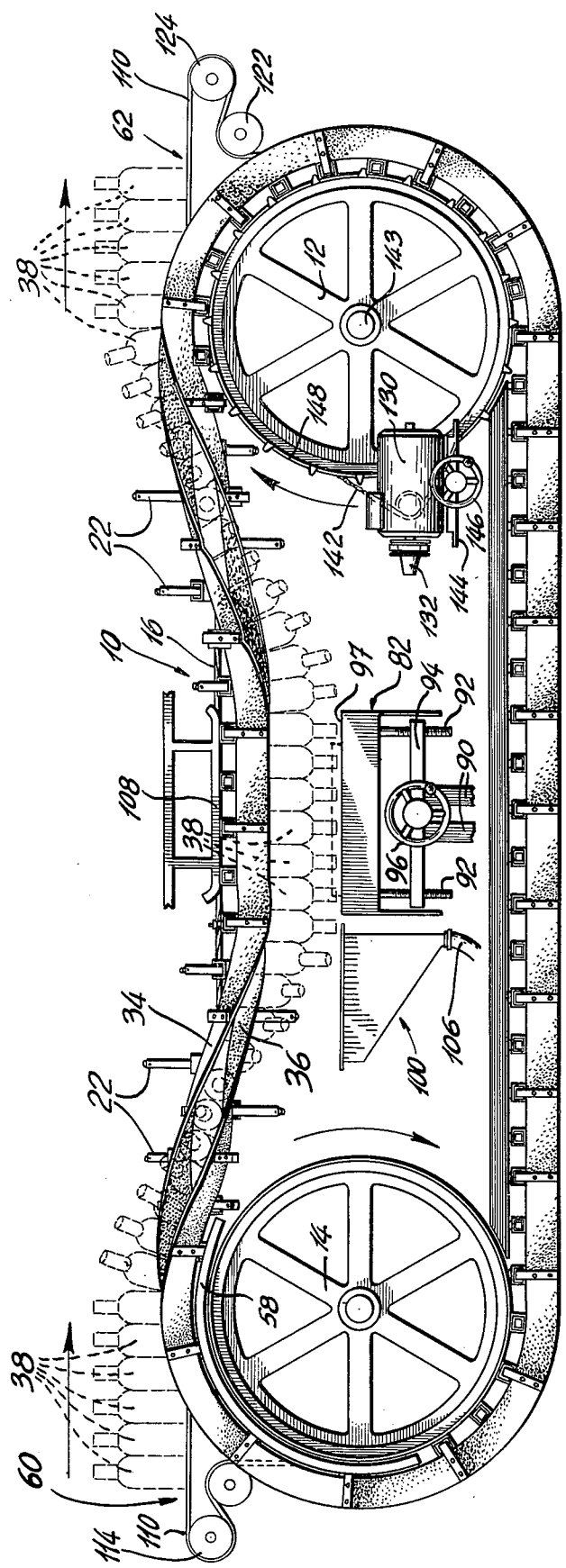
FIG. 2 is a side elevational view of the embodiment according to FIG. 1 with the outer housing removed.
Figure 3:
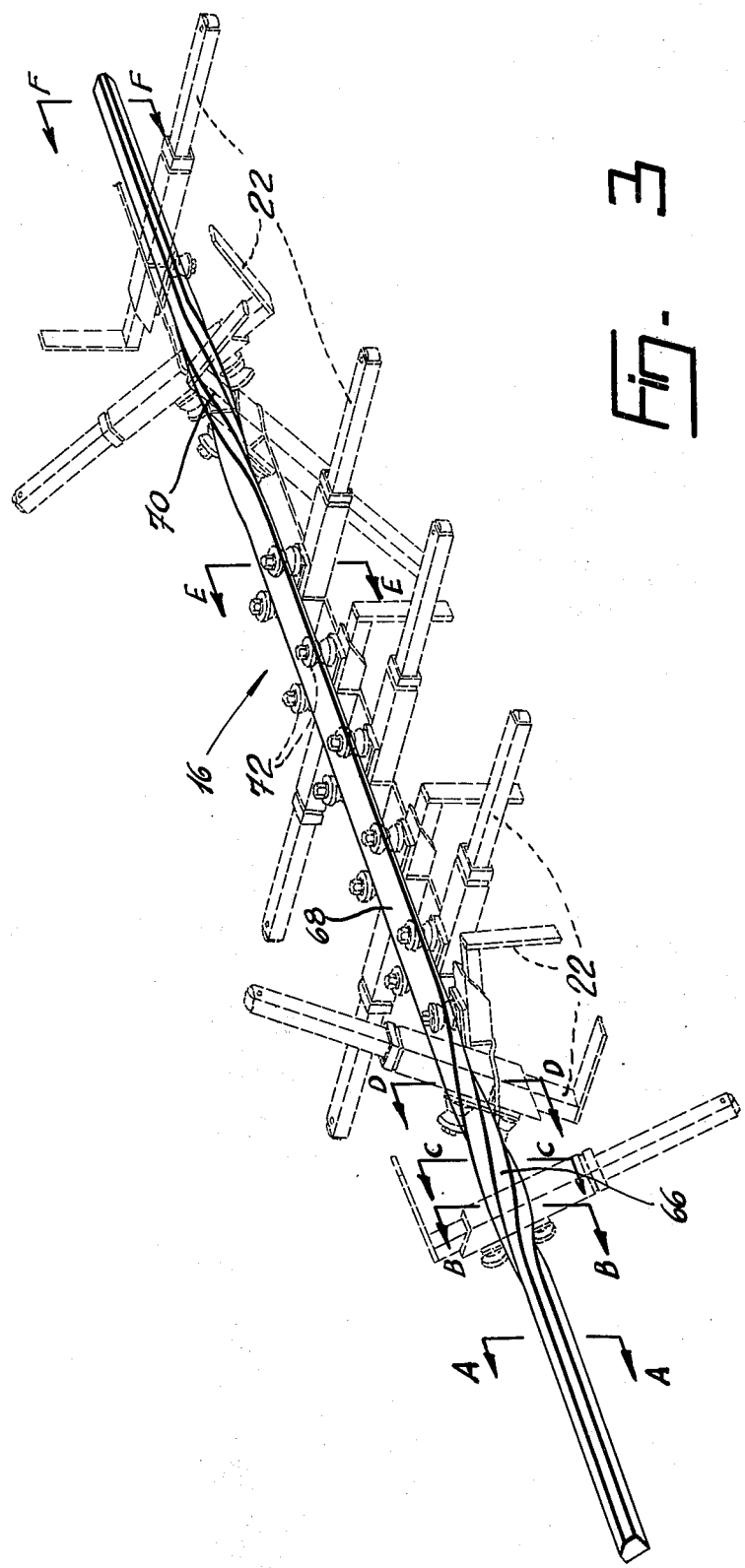
FIG. 3 is a perspective view of one embodiment of the upper track according to the subject invention, a plurality of clamp means supported by the upper track being illustrated in phantom in various positions along the length thereof.
Figure 3A:
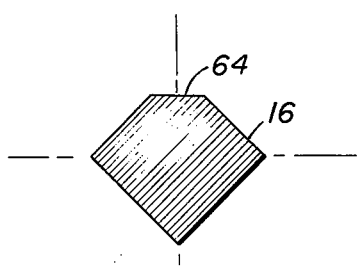
FIGS. 3A–3F illustrate vertical cross sections of the upper track according to FIG. 3, taken at various positions along its length.
Figure 3B:
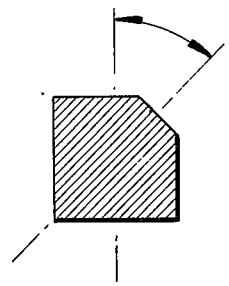
Figure 3C:
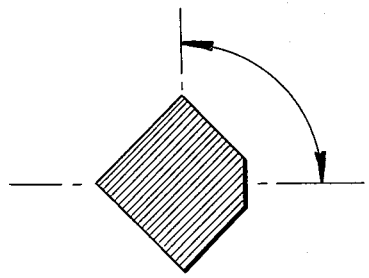
Figure 3D:
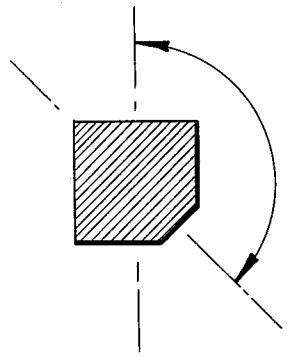
Figure 3E:
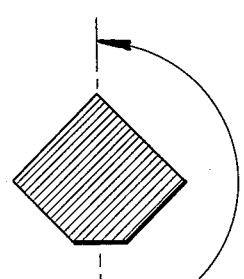
Figure 3F:
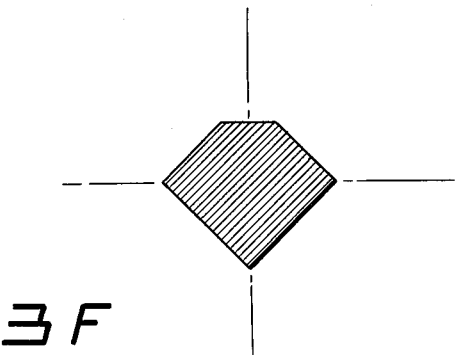

As best illustrated in FIGS. 1 and 2, a clamping conveyor indicated generally by reference numeral 10 is supported by two spaced-apart, vertically aligned wheels which will be referred to herein as the drive wheel 12 and the driven wheel 14. As will be described later, drive wheel 12 initiates the linear movement of the clamping conveyor 10. Vertical support is provided to the portions of the clamping conveyor 10 extending between the drive wheel 12 and driven wheel 14 by an upper track 16 and a lower track 18. The upper track 16 supports the clamping conveyor 10 from uppermost point of travel of the wheel 14 at which the conveyor 10 passes out of contact with the wheel 14 to the uppermost point of travel of the wheel 12 where the conveyor enters into contact with wheel 12. Similarly, the lower track 18 supports the clamping conveyor 10 between the lowermost points of travel of the wheels 12 and 14.

Figure 5:
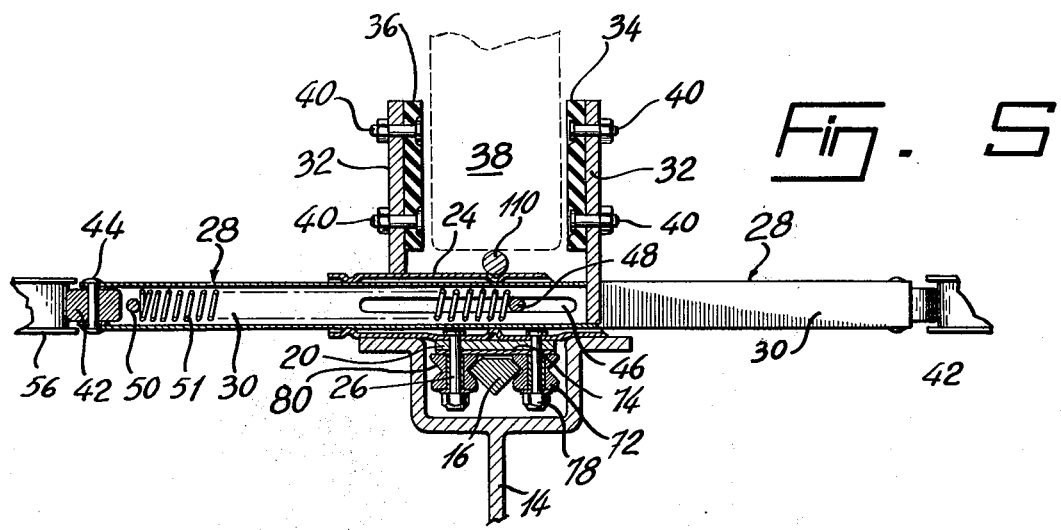
FIG. 5 is vertical cross-section of the clamp means and endless support member adjacent the top of the driven wheel immediately prior to the clamping conveyor grasping a container which is illustrated in phantom.
Figure 6:
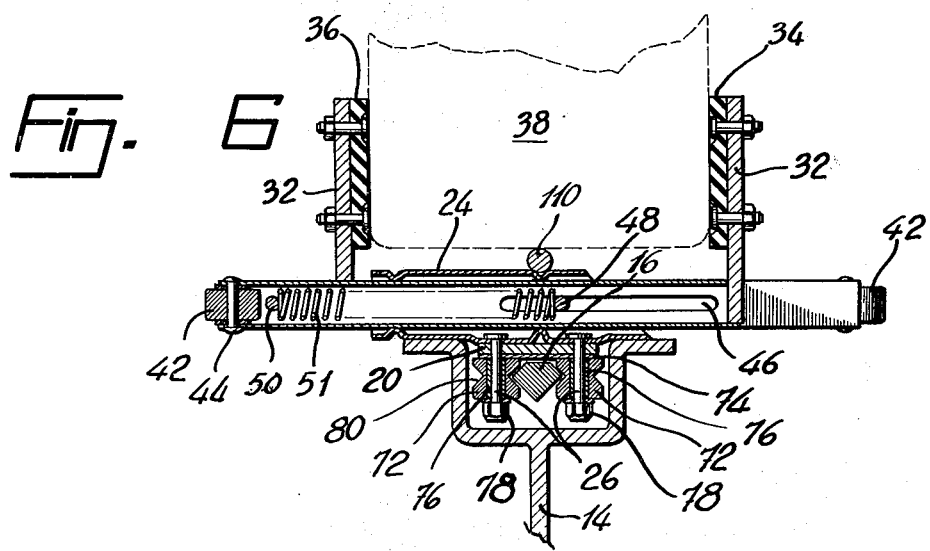
FIG. 6 is a vertical cross-section similar to FIG. 5 wherein the clamp means and gripping means are separated further apart in order to grasp a larger container than is illustrated in FIG. 5.
Figure 7:
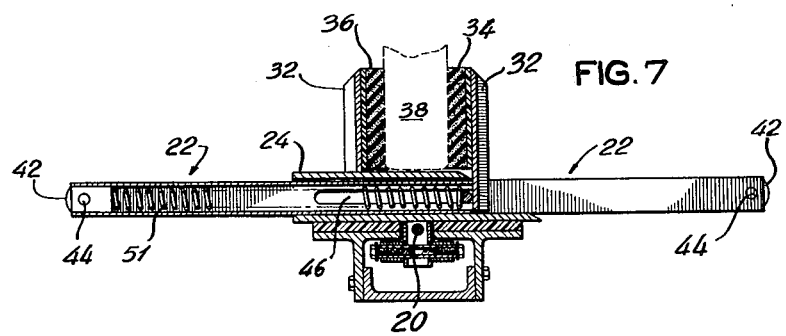
FIG. 7 is a vertical cross-section of another embodiment of the clamp means and endless support member according to the subject invention, supporting a container illustrated in phantom.
Figure 8:
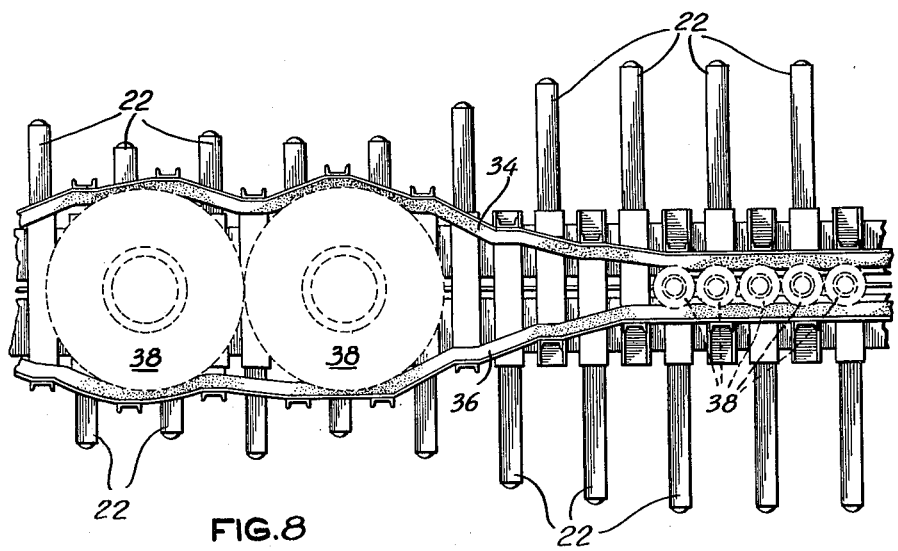
FIG. 8 is a plan view of the clamping conveyor simultaneously conveying containers of two different sizes.

The clamping conveyor 10, as best illustrated in FIGS. 5 and 6, includes an endless support member 20 comprising a flat, flexible belt made of rubber or any other suitable material which is sufficiently flexible to accommodate the movements of the clamping conveyor 10. A further embodiment of the endless support member 20 is shown in FIG. 7 wherein support member 20 comprises an endless cable in place of the belt. With respect to the embodiment of FIGS. 5 and 6, a plurality of spaced-apart clamp assemblies or means 22 are rigidly secured to an outer surface of the endless support member 20. The clamp means 22 extend transversely to the direction of travel of the endless support member 20 and are situated parallel to one another with equal spacing between adjacent clamp means.

Each of the clamp means 22 includes an outer housing 24, rigidly secured to the endless support member 20 by a pair of downwardly extending studs 26, and an L-shaped member 28 having a base arm as a hollow portion 30 slidably mounted in the outer housing 24 and an upstanding clamping arm or leg portion 32 rigidly secured to an end thereof. Adjacent clamp means 22 face in opposite directions such that the leg portion 32 of one L-shaped member 28 is situated near one edge of the support member 20 while the leg portion 32 of an adjacent member 28 is situated near an opposite edge of the support member 20.

Each of the leg portions 32 situated near one edge of the endless support member 20 support a flexible endless gripping member 34 while the leg portions 32 situated near the opposite edge of the member 20 support a second flexible endless gripping member 36. The gripping members 34 and 36 are identical, vertically disposed belts of rubber or other suitable material which is sufficiently flexible to accommodate the movements of the L-shaped members 28, while transmitting the desired clamping force from the members 28 to the containers 38 situated between the gripping members. Further, inner adjacent surfaces of the endless gripping members 34 and 36 must have a sufficiently high coefficient of friction so as to be able to simultaneously grip a number of large containers, and, if necessary, to invert the containers being conveyed by the clamping conveyor 10. One such belt which has been found to be satisfactory in practice is a "LAW-JACK" (trade mark) belt. Each of the gripping members 36 and 38 are secured to their respective L-shaped moveable members 28 by suitable fasteners such as nuts and screws 40.

The end of each L-shaped moveable member 28 opposite from the upstanding leg portion 32 includes a camming surface comprising a roller 42 rotatably mounted about a vertical axle formed from a rivet 44, such that a portion of the roller 42 extends outwardly beyond the end of the hollow portion 30, the function of which will be discussed below. The hollow portion 30 of the L-shaped moveable member 38 is of rigid metal construction and includes a pair of elongated horizontal slots 46 in its opposite sidewalls. The slots 46 extend from a point adjacent the leg portion 32 a distance approximately equal to half the length of the hollow portion 30 of the momeable member 28.

A horizontal pin 48 extends transversely through the slots 46 and is rigidly secured at its ends to the sidewalls of the outer housing 24. A second pin 50, which is parallel to pin 48, is rigidly secured at its ends to the interior sidewalls of the L-shaped movable member 28 adjacent the end thereof removed from the upstanding leg portion 32. Situated within the hollow L-shaped movable member 28 intermediate the pins 48 and 50 is a resilient means comprising a coil spring 51, the opposite ends of which are biased against the two pins 48 and 50. Since the pin 48 extends through the slots 46 in the sidewalls of the L-shaped member 28, the movable member is thereby permitted to slide within the housing 24 between the points of engagement of the pin 48 with the opposite ends of elongated slots 46.

In order to minimize sliding friction between the outer housing 24 and the L-shaped movable member 28, the former is provided with two sets inwardly directed bosses 52 and 54 which extend about the inner perimeter of the housing 24. As a result, the hollow portion 30 of the movable member 28 is only supported by the sets of bosses 52 within the housing 24, thereby minimizing the sliding friction between the two parts.

As noted above, a portion of the roller 42 extends outwardly beyond the end of the L-shaped moveable member 28. The function of the rollers is to engage cooperating camming surfaces comprising two pairs of curved plates 56 and 58 which are shown as being channel sections. Rollers 42 are utilized in order to minimize the frictional engagement between the pairs of curved plates 56 and 58 and the ends of the L-shaped moveable members 28, although other suitable means can be used in place of the rollers 42. The pair of curved plates 56 are situated on either side of, and adjacent to drive wheel 12, each plate following the curvature of the wheel part way around the circumference thereof. Similarly, the pair of curved plates 58 are disposed on either side of the driven wheel 14 and likewise follow the curvature of the driven wheel 14. Each pair of curved plates is so situated as to engage the rollers 42 of the L-shaped moveable members as the clamping conveyor 10 passes around the wheels 12 and 14. Engagement between the rollers 42 and the curved plates 58, for examplle, effect movement of the L-shaped moveable members 28 relative to their respective outer housings 24. As best seen in FIGS. 5 and 6, movement of the members 28 in contact with plates 58 results in compression of the coil springs 51 situated within the hollow portions 30 while at the same time separating the flexible endless gripping members 34 and 36 which are supported by the L-shaped moveable members 28.

The curved plates 58 are identical in construction and are secured in position to the frame of the apparatus on either side of the driven wheel 14 so as to converge towards an adjacent side of the wheel 14 in the direction of rotation thereof, that is, clockwise in the embodiment shown in FIGS. 1 and 2. The distance between plates 58 is a minimum at a location close to the uppermost point of travel of the driven wheel 14, the plates 58 then diverging away from the sides of wheel 14 to the uppermost point of travel of the wheel 14. The separation of the gripping members 34 and 36 permits the insertion of containers 36 therebetween, the largest size of container which can be accommodated by the clamping conveyor 10 being determined by the maximum separation of the gripping members. Since the restoring force applied by the coil springs 51 to the moveable members 28 increases as the lengths of springs 51 decrease due to compression, it is evident that the force applied by the moveable member 28 to the gripping members 34 and 36 will increase at the same time. Thus, the greater the distance between the gripping members 34 and 36, the greater will be the gripping force applied by the members 34 and 36 to containers 38 situated between them.

The curved plates 56 associated with drive wheel 12 are similar in construction and function to curved plates 58, plates 56 thereby permitting gripping members 34 and 36 to separate and release the containers situated therebetween. After releasing the containers, the curved plates 56 permit the gradual return of the coil springs 51 and L-shaped moveable members 28 to their normal positions as the clamping conveyor 10 passes around the drive wheel 12.

In order to supply containers to the clamping conveyor 10, a feed conveyor assembly 60 is mounted in alignment with the driven wheel 14, the assembly 60 extending between the gripping members 34 and 36, such that the discharge end of the assembly 60 is situated adjacent the uppermost point of travel of the wheel 14. At this location, the gripping members 34 and 36 grasp the containers 38 being carried by the feed conveyor assembly. Likewise, a discharge conveyor assembly 62 is mounted adjacent drive wheel 12 to transport containers 38 being released by the clamping conveyor 10 away from the apparatus. Adjustable guides, not shown in the drawings, may be provided for the feed and dischage conveyor assemblies 60 and 62 in order to guide the containers into and out of contact with the clamping conveyor 10.

As pointed out previously, upper and lower tracks 16 and 18 are secured to the frame of the apparatus and are situated between the drive wheel 12 and driven wheel 14 to provide support for the clamping conveyor 10 during its passage between wheels 12 and 14. Both the upper and lower tracks 16 and 18 comprise an elongated bar of square cross-section, one corner of which has been removed along the length of the bar. As seen in FIGS. 3A-3F, the flat surface 64 of the bar produced from the removal of the corner is parallel to a diagonal extending between the two remaining opposed corners of the square cross-section of the bar. As can be seen from FIGS. 5 and 6, the removal of the corner provides clearance for movements of the endless support member 20. Part way along the length of the upper track 16 in a direction of travel of the clamping conveyor 10, the track includes a first twisted section 66 wherein the bar is twisted through an angle of 180°, the flat surface 64 being thereby rotated from an upper horizontal position to a lower horizontal position to a lower horizontal position, as best illustrated in FIGS. 3A to 3E. A central portion 68 of the upper track 16, having a cross-section indicated by FIG. 3E, extends over part of the length of the bar, the truck then having a second twisted section 70 wherein the bar is rotated through 180°, in a direction of rotation opposite to the direction of rotation of the first twisted section 66.

While the lower track 18 has a vertical cross-section identical to that of the upper track 16, the lower track 18 is not provided with twisted portions along the length thereof. As such, the lower track 18 only provides support for the weight of the clamp means 22 and the endless support member 20 as the clamping conveyor 10 moves between the lowest points of travel of the wheels 12 and 14.

The clamping conveyor 10 is supported from the upper and lower tracks 16 and 18 by means of clamp rollers 72. As best illustrated in FIGS. 5 and 6, the upper ends of studs 26 are secured to the housing 24 by spot welding or other suitable means which does not interfere with the sliding movement of the L-shaped moveable members 28. The studs 26 extend through the endless support member 20 and each pair of adjacent studs 26 associated with a housing 24 are interconnected by a roller plate 74 which is urged against the lower surface of the endless support member 20 in order to provide stiffening therefor. Rotatably mounted on the portion of each stud 26 extending beneath the respective roller plate 74 is a clamp roller 72, each roller 72 having an inner cylindrical brass spacer 76 or other suitable bearing means, and being supported in a fixed position on the stud 26 by means of a washer and locknut 78.

Each clamp roller 72 has a V-shaped groove in its outer surface, the V-shaped grooves 80 of the clamp rollers 72 engaging the upper and lower tracks 16 and 18 at the two opposing corners thereof. As a result, as the clamping conveyor 10 advances along the length of the upper track 16, the endless support member 20 and the clamping means 22 are rotated through 180° by the first twisted section 66 of the upper track 16. When the endless support member 20 reaches the central portion 68 of the upper track 16, the clamping conveyor 10 and the containers 38 supported thereby are in an inverted position.

Figure 4:
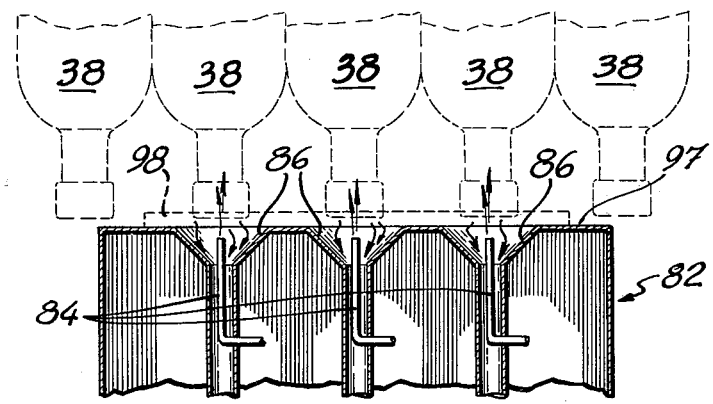
FIG. 4 is a vertical cross-section of the vacuum head assembly according to FIG. 1, taken along the IV—IV of FIG. 1, with a number of empty containers illustrated in phantom being supported above the vacuum head assembly by the clamping conveyor.

A vacuum head assembly 82 is supported beneath the central portion 68 of the upper track 16, adjacent months of the inverted containers 38. One embodiment of the vacuum head assembly 82, illustrated in FIG. 4, provides three upwardly directed jets of air through nozzles 84, the air designed to loosen foreign materials from the interior of the containers 38 being cleaned by the vacuum head assembly 82. Each nozzle 84 is situated within a respective funnel-shaped trough 86, each trough 86 being designed to collect the particles of foreign materials which are loosened by the jets of air directed into the inverted containers. The lower end of each funnel-shaped trough 86 is connected to a vacuum removal system, not shown, which effectively removes the particles of foreign materials which land within the funnel-shaped troughs 86. The funnel-shaped troughs may be replaced by a collection slot extending the length of the assembly 82, a lower portion of the slot being connected to a vacuum removal system.

After the containers 38 have passed across the vacuum head assembly 84, the clamp rollers 72 engage the second twisted section 70 of the upper track 16, thereby twisting the endless support member 20 and the clamp means 22 back through 180°, thereby returning the containers 38 to their initial upright positions.

The vacuum head assembly 82 is mounted on a horizontal frame member 88 which is, in turn, supported in position by vertical frame members 90. The vacuum head assembly is so mounted as to permit vertical displacement thereof, the assembly therefore being supported by a pair of vertically-extending shafts 92 mounted within a shaft support 94 (FIG. 2). Vertical movement of the shafts 92 is effected by means of a handwheel 96 mounted on a suitable axle and interconnected with the shafts 92 by suitable gearing, not shown. The upper surface 97 of the vacuum head assembly 82 includes container guides 98 (FIG. 1), the container guides 98 being so constructed as to maintain the alignment of the mouths of the containers 38 above the compressed air jets during movement of the containers 38 over the vacuum head assembly 92. Adjustment of the height of the vacuum head assembly 82 is provided in order to accommodate the varying sizes of containers which can be cleaned by the apparatus. By situating the upper surface 97 of the vacuum head assembly 82 close to the mouths of the containers, a better cleaning of the containers by means of the air jets is achieved.

A drop-out section 100 is situated upstream of the vacuum head assembly 82 and is provided to gather foreign materials falling out of the containers 38 to be cleaned as they are being inverted by the clamping conveyor 10. The forward wall 102 of the drop-out section 100 slopes downwardly towards the rear wall 104 thereof, the drop-out section being provided at its bottom with a vacuum connection 106 to permit removal of the foreign materials accumulating within the drop-out section 100.

Guide means 108 are situated adjacent the upper surfaces of the clamp means 22 above the vacuum head assembly 82 in order to maintain the clamp means 22 in a horizontal position as they pass above the vacuum head assembly 100. In this way, the clamp means 22 are prevented from pivoting about the upper track 16, which would otherwise tend to decrease the gripping action between the flexible endless gripping members 34 and 36 and the conatiners 38 being conveyed by the clamping conveyor 10. Similarly, idler wheels and camming surfaces not shown in the drawings are provided adjacent the wheels 12 and 14 in order to maintain the clamp means 22 in a horizontal position as they pass around the wheels 12 and 14 and engage the curved plates 56 and 58. Thus the idler wheels engage lower susurfaces of the L-shaped movable members 28 while camming surfaces engage upper surfaces of the L-shaped movable members 28, thereby limiting pivotal movement of the movable members as they engage the curved plates 56 and 58.

Supported by the upper surface of the outer housings 24 is a conveyor belt 110 having a circular cross-section. In addition to providing a support for the bottoms of the containers 38, the conveyor belt 110 also forms an integral part of both the feed conveyor assembly 60 and the discharge conveyor assembly 62. The feed conveyor assembly 60, for example, utilizes two idler pulleys 112 and 114 which are rotatably mounted on the frame of the apparatus. The conveyor belt 110 passes part way around the wheel 14, is guided by idler pulley 112 situated adjacent wheel 14 into contact with idler pulley 114, from which the conveyor belt 110 advances horizontally along a conveyor guide 116, back into contact with the outer housings 24.

The conveyor guide 116 comprises essentially a channel situated between a pair of spaced-apart guide plates 118 and 120. As the conveyor belt 110 passes along the conveyor guide 116 between plates 118 and 120, a small portion of the round belt 110 protrudes above the upper surfaces of the plates. Engagement between the belt 110 and the bottom of containers 38 placed on the guide plates 118 and 120 advances the containers 38 into contact with the clamping conveyor 10.

Adjustable brackets mounted on the feed conveyor assembly prevent the container from tipping while being moved by conveyor belt 110.

The discharge conveyor assembly 62 comprises an arrangement identical to the feed conveyor assembly 60, utilizing idler pulleys 122 and 124 and conveyor guide 125 to support the conveyor belt 110 between guide plates 126 and 128.

Idler pulley 112, in addition to guiding the conveyor belt 110 between wheel 14 and idler pulley 114, is provided with a takeup screw in order to permit tensioning of the conveyor belt 110 after the belt 110 is mounted on the clamping conveyor 10. Likewise, idler pulley 122 is provided with a similar take-up screw in order to obtain additional tensioning of the conveyor belt 110. The conveyor belt 110 can be made of rubber or other suitable material, a "HABASIT POLYCORD" (trademark) belt having been used successfully for this application.

As best seen in FIG. 1, the drive for the clamping conveyor 10 and conveyor belt 110 is provided from a variable speed drive motor 130 having a variable pitch pully 132 supporting a variable speed belt 134 which connects variable pitch pulley 132 to a flat belt-driven pulley 136 mounted on an input shaft of a speed reducer 138. The output shaft of the speed reducer 138 supports a sprocket 140 which is connected by means of a roller chain 142 to a second sprocket, not shown, mounted on the drive wheel axle 143.

The variable speed drive motor 130 and the speed reducer 138 are mounted on a drive support 144, the motor being movably mounted on the drive support such that the distance between the variable pitch pulley 132 and the flat belt driven pulley 136 can be varied in a known manner. A handwheel 146 is provided to permit the manual adjustment of the distance.

Secured to each side of the outer flange portion of the drive wheel 12 adjacent the outer periphery thereof are a plurality of sprockets sections 148. The sprocket sections 148 are secured to the outer periphery of the drive wheel by means of suitable fasteners such that a portion of the teeth of each sprocket section extend outwardly of the outer circumferential surface of the drive wheel 12. The teeth of the sprocket sections on each side of drive wheel 12 are aligned and are so spaced that a sprocket tooth on each side of the drive wheel 12 simultaneously engages a successive clamp means 22 as the clamping conveyor 10 passes around the drive wheel 12. In this way, the clamping conveyor 10 is pulled through the apparatus.

I claim:
1. A clamping conveyor for transporting containers of various sizes comprising:
  a. spaced driven and driving wheels and means rotating said driving wheels;
  b. a flexible endless support member mounted to wind over said driving and driven wheels to be brought into endless motion to convey containers placed thereon;
  c. a plurality of clamping assemblies mounted on said support member in spaced relationship along the length thereof, each clamping assembly comprising:
    — an open ended housing fixed to said support member transversely thereof with respect to the direction of motion applied thereto;
    — an L-shaped container gripping member having a base arm slidably extending into said open ended housing to be guided therein and having a clamping arm upstanding from the plane of said support member and on one side thereof, and
— resilient means acting on said L-shaped gripping member to bias the clamping arm thereof toward said support member;

d. wherein successive clamping arms of said L-shaped members are disposed on opposite sides of said support member, and e. a pair of endless flexible gripping belts each on one side of said support member and means securing said belts to said clamping arms.

2. A clamping conveyor according to claim 1, wherein said endless support member divides up into an upper strand and a lower strand and said conveyor further comprises: camming tracks disposed on either side of said wheels along siad upper strand; camming means at the free ends of said base arms of said L-shaped gripping members mounted to contact said camming tracks; wherein said camming tracks each includes a central section, said central sections being located at a distance from said support member such as to push said clamping arms of said L-shaped members away from the corresponding edges of said support member against the bias of said resilient means to widen the space between said clamping arms for the insertion and the removal of containers therebetween.

3. A clamping conveyor according to claim 2, wherein each open ended housing includes inwardly directed bosses, the base arm of said L-shaped members being supported on said bosses thereby decreasing sliding friction between said base arms and said housings.

4. A clamping conveyor according to claim 2, wherein said gripping belts are made of resilient frictional material whereby said containers gripped by said clamp assemblies and by said gripping belts are held firmly on said support member.

5. A clamping conveyor according to claim 2, wherein said camming means are rollers freely mounted for rotation at the free ends of said base arms of said L-shaped gripping members, said rollers operatively engaging into said tracks to widen the space between said clamping arms against the bias of said resilient means.

6. A clamping conveyor according to claim 2, including support track means to guide said support member upper strand and cause it to pivot axially by substantially 180° whereby, as the containers are being conveyed along said upper strand, they move from upright to fully inverted positions and vice versa, said support track means comprising:
— a rigid bar beneath said support member upper strand, said bar having a pair of projections laterally extending from either side thereof and having a central portion twisted by 180° with respect to the end portions of said bar;
— rollers on either side of said rigid bar, said rollers having peripheral grooves freely receiving said projections of said rigid bar, and
— means mounting said grooved rollers beneath said conveying support member for rotation.

7. A clamping conveyor according to claim 2, wherein said clamping tracks comprise end sections merging into said central sections and moving gradually away from said support member whereby to free said clamp assemblies into gripping engagement of the clamping arms thereof with the containers being conveyed.

8. A clamping conveyor according to claim 2, wherein the driving wheel includes toothed segments secured to opposite peripheral flanges thereof, portions of said toothed segments extending outwardly of the outer circumference of said driving wheel and engaging said housings thereby displacing said clamp assemblies and endless support member along an endless path.

9. A clamping conveyor according to claim 2, including an endless conveyor belt fixed to the top surfaces of said outer housings, said endless conveyor belt supporting bottoms of the containers away from the top surfaces of the housings of the clamp assemblies.

10. A clamping conveyor according to claim 9, wherein at least two pulleys support the conveyor belt in a path of travel leading away from said driven wheel, between a first pair of spaced-apart guide plates, and back into contact with the top portions of the housings, the first pair of guide plates being substantially horizontal and together with the conveyor belt forming a feed conveyor assembly for the clamping conveyor; the conveyor belt passing between the first pair of guide plates being supported by a first conveyor guide such that a portion of the conveyor belt protrudes above upper surfaces of the first pair of guide plates, thereby engaging bottoms of containers situated on the first pair of guide plates and drawing the containers into engagement with the clamping conveyor.

11. A clamping conveyor according to claim 9, wherein at least two pulleys guide the conveyor belt in a path of travel leading away from the drive wheel, between a second pair spaced-apart guide plates, and back into contact with the top portions of the outer housings, the second pair of guide plates being substantially horizontal and together with the conveyor belt forming a discharge conveyor assembly for the clamping conveyor; the conveyor belt passing between the second pair of guide plates being supported by a second conveyor guide such that a portion of the conveyor belt protrudes above upper surfaces of the second pair of guide plates, thereby engaging bottoms of containers situated on the second pair of guide plates and drawing the containers out of engagement with the clamping conveyor after being released by the gripping means.

* * * * *